UNITED STATES PATENT OFFICE.

JACOB E. BLOOM, OF NEW YORK, N. Y.

FOOD PRODUCT AND METHOD OF MAKING THE SAME.

No. 883,930.  Specification of Letters Patent.  Patented April 7, 1908.

Application filed August 1, 1904, Serial No. 219,106. Renewed December 11, 1907. Serial No. 406,048.

*To all whom it may concern:*

Be it known that I, JACOB E. BLOOM, a citizen of the United States, residing at New York, in the county of New York and State of New York, have invented certain new and useful Improvements in Food Products and Methods of Making the Same; and I do declare the following to be a full, clear, and exact description of the invention, such as will enable others skilled in the art to which it appertains to make and use the same.

At present, food preparations are made according to some accepted recipes which prescribe the method of preparation including amounts of sundry native food materials. I call each of said materials a "food stuff", and the preparation from one or more thereof as per any recipe, I call a "food product".

Heretofore in the preparation of any food product containing eggs, no attempt has been made to prepare the same so that the fat content thereof shall have a predetermined content of olein, palmitin and stearin, or an approximation thereof. This is objectionable for the reason that the food stuff, or the resulting food product may, and usually does, contain an excess of palmitin or stearin, or both, or other fat having higher melting point which obstructs digestion; or the fat in the food stuff or food product has not the proximate constituents in the proportion to insure a liquid state in the stomach, nor the proportions of olein, palmitin and stearin in which they are finally assimilated in the system.

Some oils contain tryglycerids of fatty acids having higher melting point than stearin; to wit, the hydroxystearin in egg oils; and arachin in peanut oil, etc. In all such cases I estimate same for use by dyspeptics as equivalent to so much stearin, or stearin and palmitin; and I provide in the product a pro rata amount of olein and palmitin for the actual stearin, and in some cases also for such total equivalent of stearin as per the oil formulas hereafter cited, and in some cases such addition of olein, if any, as may be requisite to insure a liquid state in the stomach at 37 7/9° C.

My invention, which is the result of physiological and chemical investigations, has for its object the rendering of a food stuff, or food product, containing an ingredient having a higher melting or boiling point than stearin, more readily digestible and assimilable by the human system, by so modifying the fat content thereof or of the whole food product that it shall comprise olein, palmitin and stearin in approximately the proportions in which said proximate principles are found in human fat, whereby the proportion of solid fats existing in said food stuff or food product is so changed that the resulting fat content is liquid at the body temperature and the useless work and waste of energy incident to the digestion in the system of the excess of solid fats is avoided and said hitherto wasted energy is rendered available for concentration upon the digestion of other food.

To carry out my invention, in making an egg food product, I first, extract by methods well known to chemists, and determine the amount of oil in each food stuff to be used as per the recipe in making the food product; or, as an alternative step, I extract and determine the amount or weight of oil in a food product prepared according to said recipe and in either event I determine by well known methods the approximate amount of percentage of olein, palmitin and stearin in said extracted oil; and the amount of hydroxystearin or arachin or other fatty acid or triglycerid thereof, having a higher melting point than stearin. Second, I prepare what I call a culinary oil or oils comprising such an amount of olein or palmitin or stearin, or any two or all thereof, that when the same is compounded or combined by mixing or cooking or otherwise with the oil in the food stuff or food stuffs respectively whose oil content has been determined as aforesaid, then the resulting oil in the whole food product shall comprise an amount of olein, palmitin and stearin in the approximate proportion respectively as found in the hereinafter cited or other predetermined oil formula; and further in some cases, an amount of olein of similar pro rata to the hydroxystearin, calculating the latter as equivalent to palmitin and stearin or stearin only. Third: I then incorporate the said amount of culinary oil or oils with the food stuffs in the customary manner or as hereafter described, and when the recipe calls for a stated amount of fat or oil which exceeds said amount of culinary oil, I also add said excess in amount and consisting of one of the oils described in my application for Letters Patent No. 198,364, filed March 14, 1904, or in Serial No. 139200 filed Jan. 15, 1903, which applications have become patents numbered 782,821 and 782,820, respectively, granted February 21, 1905.

In order to further explain the present invention, a few typical examples of many which are within the scope of the present invention will hereinafter be given. The human fat or oil of an adult in some cases has been found to comprise 86.21% olein, 7.85% palmitin, and 1.93% stearin; and in a child, 65.04% olein, 27.81% palmitin and 3.15% stearin. Such percentages or proportions may vary for different ages and conditions of man, and such constitutes, respectively, the oil formulas to be attained in the food stuff cooked or otherwise used with my improved culinary oils; it being understood that the scope of my invention covers all such variations, for I do not restrict myself to the aforesaid specific percentages or proportions, which are cited as examples and to aid in an understanding of the principles and advantages of the invention. In addition to olein, palmitin and stearin the human fat or oil of an adult comprises minute quantities of caproin, myristin, and other undetermined tri-glycerids of fatty acids. All the fat of an egg, excepting about two-one-hundredths of one per cent. is found in the yolk of the egg, and the yolk contains on an average, $33\frac{1}{3}$% of fat, though in some cases it has been found to contain 25% to 30%. In this example I take the content of oil to be one-third of the weight of the yolk.

The approximate analysis of the fat of the yolk of the egg shows it to contain approximately 81.8% olein, 9.6% palmitin, .6% stearin and 6.4% hydroxystearin. The last named fat is far more indigestible than stearin, its melting point averaging 81 to 85° C. whereas stearin has a melting point of 71.6° C. Nevertheless, for the purpose of this example, I calculate it as so much stearin as though the whole stearin aggregated 7% to insure a liquid state in the stomach at body temperature.

Example 1. If now I mix the following, all weights in grams or pounds, or other units, the result is as follows:—

|  | Olein. | Palmitin. | Stearin. |
|---|---|---|---|
| 100 egg oil | 81.8 | 9.6 | 7 |
| 250 sweet almond oil | 219.55 | 15 | 0 |
| 17 olive oil | 11.39 | 4.25 | 0 |
| 367 Total oil in product | 312.74 | 28.85 | 7 |
| Equals approximate percentages | 86 | 7.85 | 1.91 |

To attain this result, I have used an egg culinary oil, compounded of 250 units sweet almond oil with 17 units of olive oil. Said olive oil contained 67% olein and 25% palmitin and said sweet almond oil contained 87.82% olein and 6% palmitin. With reference to the amount of the egg culinary oil to be used with one egg, I found the weight of one yolk to be 18 grams; the oil content thereof to be 6 grams.

From the aforesaid calculation I find that I require 2.67 units of the egg culinary oil to each unit of oil in the egg. Therefore, 6 times 2.67 gr., = 16.02 gr. of said egg culinary oil, is to be cooked or otherwise used with each egg so as to constitute the oil in the whole cooked product of a like constituency as regards olein, palmitin and stearin as human fat.

Example 2. To prepare a mayonnaise dressing, I use the said egg culinary oil No. 1 with the yolk of the egg and other ingredients in the same manner as olive oil or any other oil is now used in preparing mayonnaise dressing, excepting that I only use 16 gr. thereof to each egg; and if additional oil be desired, then such additional oil should be of the adult oil formula aforesaid.

Example 3. Another formula or oil for egg culinary oil or salad oil, is obtained by depalmitinizing olive oil until the ratio of olein to palmitin therein shall be about as 12 to 1, and then using four grams or units thereof with each gram of oil in the egg; estimating latter at 6 grams, it is necessary to use $4 \times 6 = 24$ grams of this depalmitinized olive oil with each egg. Said depalmitinized olive oil can be prepared as per method described in my patent application, Serial No. 198,364, filed March 14, 1904, by subjecting virgin olive oil to cold until a material amount of the palmitin therein has solidified; then by cold pressure or cold filtration at like temperature separate the liquid from the solid fat; and repeat this operation once or twice, or oftener, at a lower temperature—but always above the freezing point of olein, until about 26% of the weight of the whole olive oil has been thus removed, which in one case I found to consist of 19.3% palmitin and 6.75% olein. This original olive oil contained about 67% olein and 25% palmitin; thus there remained about 60.3% olein and 4.75% palmitin.

In order that the oil in the whole food product shall attain as regards olein, palmitin and stearin the proportion of the same as found in adult human fat, to wit: 89.83: 8.16: 2.01—insamuch as the oil in the egg contains 7% of stearin—then the proportions in the product from 100 units egg oil should be about 314.41: 28.42 :7. Thus:

|  | Olein. | Palmitin. | Stearin. |
|---|---|---|---|
| 100 egg oil content | 81.8 | 9.6 | 7 |
| 400 dep. olive oil or egg salad oil | 241.2 | 18.8 |  |
| 500 Total in product | 323.0 | 28.4 | 7 |
| Approximating proportions | 89 to 92 | 8 | 2 | with the olein preferably in excess on account of dissolving hydroxystearins.

As one egg contains 6 grams oil, I use

4×6=24 grams of said salad oil with one egg to make a salad dressing or for cooking one egg. If additional oil is desired, I use one of the adult oils prepared as described in above application. Where the egg product is intended for consumption by young children or infants, I use a different egg culinary oil, prepared in an analogous manner to the above adult culinary oil and also use for said excess one of the oils of the child's oil formula as above described.

In the preceding examples I have treated the hyrdoxystearin of the egg oil as so much stearin, but I do not restrict myself to so doing. In some forms I omit this feature of like classification and modify the oil content on the basis of absolute stearin only, or, in other words, I ignore the hydroxystearin, there being sufficient olein to liquefy all the fats at body temperature. Thus:—

Example 4.

|  | Olein. | Palmitin. | Stearin. |
|---|---|---|---|
| 100 egg oil comprising | 81.8 | 9.6 | .6 |
| With compound oil containing— |  |  |  |
| 100 olein No. 1 | 93.97 | 4.28 | 1.75 |
| 7 double pressed beef oleo | 3.5 | 1.75 | 1.75 |
| 207 Total comprising | 179.27 | 15.63 | 4.00 |
| Approximate proportions | 86.6 | .8 | .2 |

Thus by mixing with the egg for each unit of oil in the egg, 1.07 units of a compound oil composed of the last two above named oils in the proportions stated, I attain in the egg product, an oil comprising olein, palmitin and stearin in the proportions as found in adult human fat. It is manifest that the compound oil in Examples 1 and 3 can be readily modified accordingly by the addition of stearin or of an oil in which stearin is found. The hydroxystearin of the egg is not assimilated in the human system as is stearin; and hence if no other food is eaten containing stearin, I prefer an oil to use with eggs as cited in this Example 4; but in other cases, one of the aforesaid may be preferred on account of the high melting point of the hydroxystearin, which, however, is readily soluble in said excess of olein, thereby facilitating its digestion.

Example 5. as follows is another illustration:

|  | Olein. | Palmitin. | Stearin. |
|---|---|---|---|
| For each— |  |  |  |
| 100 egg oil content comprising | 81.8 | 9.6 | .6% |
| I incorporate a compound oil comprising— |  |  |  |
| 100 lard olein No. 1 | 93 | 4.25 | 1.75 |
| 8 lard stearin | 3 | 3.4 | 1.7 |
| 208 Total comprising | 177.8 | 17.25 | 4.05 |
| Which approximates proportions of adult oil formula to wit | 88.9 | 8.6 | 2 |

Hence for each egg I incorporate about 6½ grams of lard compound oil. As hydroxystearin is not assimilated, this example more truly approximates adult oil formula, than the aforesaid.

Example 6. To attain in the egg food product a content of oil approximating the child oil formula:

|  | Olein. | Palmitin. | Stearin. |
|---|---|---|---|
| For each— |  |  |  |
| 100 egg oil content comprising | 81.8 | 9.6 | .6 |
| I mix compound oils to wit— |  |  |  |
| 18 D. P. oleo | 9 | 4.5 | 4.5 |
| 65 olive oil | 43.55 | 16.25 |  |
| 30 C. S. palmitin | 1.5 | 27.0 | 1.00 |
| 213 Total comprising | 135.85 | 57.35 | 6.1 |
| Which approximates proportion of child oil formula | 67.9 | 28.6 | 3.05 |

Hence for each egg I incorporate 6 grams × 1.13 = 7 grams approximately, of said compound oil.

For purposes of passage from the stomach to the duodenum, it is advantageous to calculate or consider hydroxystearin as a like amount of stearin or stearin and palmitin to facilitate a fluid state at body temperature, and I prefer for the latter purpose to provide an addition of olein in amount pro rata to the palmitin and stearin in said oil formulas, to wit 9 of olein to 1 of hydroxystearin for the adult and 2 to 1 for the child. With such additions I prefer Examples 4, 5 and 6. And so likewise for other native triglycerids of fatty acids having a melting point higher than stearin.

Example 7. In ordinary emulsions of an edible or medicinal oil, the emulsifying agent is a mucilage of gums or Irish moss, or analogous substance with little or no nutritive value. What is known as an egg emulsion of an edible or medicinal oil is formed by churning the oil with the yolks of fresh eggs for several hours when it is thoroughly broken up into small particles. I make an improved egg emulsion with edible or medicinal oil or with my improved oil, or both egg and an edible or medicinal oil modified as per my adult or child oil formula, the egg being substituted for the mucilage: and the same is sometimes preserved with brandy: 40 parts by volume being oil.

In the preparation of other food stuffs comprising any material amount of invisible triglycerids of fatty acids having a higher melting point than stearin, as for instance peanuts which contain an oil comprising about 5% of arachin and lignocerin I pursue a method analogous to that described above for hydroxystearin in eggs, to-wit: To increase the digestibility, I treat the arachin and lignocerin as equivalent to palmitin and stearin, and provide in the food stuff an addition of olein to insure the solubility in all stages of digestion, the amount of olein preferably being such as would be required to constitute the adult or child oil formula in the product, if all the arachin and lignocerin were the equivalent of palmitin and stearin, or stearin only.

In calculating the hydroxystearin or arachin or other triglycerid having higher melting point than stearin, for the adult oil or food, I prefer to calculate 8/10 thereof as equivalent to palmitin and 2/10 as equivalent to stearin; and for the child oil or food I prefer to calculate 28/31 portion as palmitin and 3/31 as stearin; and thereupon provide an amount of olein, etc., requisite to constitute the proportions called for in the adult or child oil formula.

For purposes of comparison, the melting points of the above named triglycerids may be considered in proportion to the following melting points of their respective acids; palmitic 62° C.; stearic 71° C.; arachidic 77° C.; hydroxystearic 77 to 81° C.; lignoceric 81° C.

My invention as hereinafter claimed contemplates within its scope the treatment of materials containing triglycerids of fatty acid having a higher melting point than stearin. Such triglycerids for the purposes of this invention may be regarded as so much stearin or stearin and palmitin, or when the composition of the food material to be treated renders it advisable, as when such material contains a larger per cent. of olein, the presence of hydroxystearin or such like material therein may be ignored.

In a prior application for a U. S. patent filed by me Jan. 15, 1903, Serial No. 139201, I have claimed sundry improvements in method of food preparation, under or upon which this application is a further improvement in and of particular species; and I do not claim the former herein.

Having thus described my invention what I believe to be new and desire to secure by Letters Patent, is:—

1. The process of treating a food product comprising a triglycerid of fatty acid having a higher melting point than stearin, which consists in determining the fat content of the material employed, as regards its olein, palmitin and triglycerid having higher melting point than stearin and in the addition to such material of fat of such composition as to bring the olein, palmitin and fat of higher melting point than stearin of the resulting product into approximately the proportions, respectively, in which olein, palmitin and stearin exist in human fat, substantially as described.

2. The process of preparing a food product having a material comprising olein, palmitin and a triglycerid of fatty acid having a higher melting point than stearin, which consists in determining the composition of the fat content of the material employed as regards olein, palmitin and triglycerids having higher melting point than stearin: adding to such material a fat of such composition as to bring the olein, palmitin and fat of higher melting point than stearin of the resulting product into approximately the proportions, respectively, in which olein, palmitin and stearin exist in human fat: and, finally, adding to such product a material containing olein, palmitin and stearin in the proportions in which these proximate principles exist in human fat.

3. The process of treating a food material containing olein, palmitin and a triglycerid of a fatty acid having a higher melting point than stearin, which consists in incorporating therewith a fat having a content of olein, palmitin and stearin such as to bring the olein and the palmitin in the resulting food product into the approximate ratio of twelve parts of the former to one of the latter, and the said olein and palmitin to comprise approximately ninety eight per cent. of the entire fat content of the resulting food material.

4. A food product containing olein, palmitin and a fat having a higher melting point than stearin, and in which the olein, palmitin and fat of higher melting point than the last named ingredient exist in approximately the proportions in which olein, palmitin and stearin are found in human fat.

5. A food product comprising an egg ingredient and a fat, and in which the fat content of the food product contains olein, palmitin and triglycerids of fatty acids having higher melting point than stearin in approximately the proportions in which olein, palmitin and stearin are found in human fat.

6. A salad dressing containing eggs and a fat comprising olein and palmitin in the approximate ratio of twelve to one, the said fat being mixed with the said eggs in the approximate ratio of 24 grams of fat to each egg.

7. A salad dressing containing eggs and oils, the total fat content of which dressing, comprises olein palmitin and stearin in the proportions approximating the proportions of the like constituents as found in human fat.

In testimony whereof, I affix my signature, in presence of two witnesses.

JACOB E. BLOOM.

Witnesses:
   Jos. Lilienthal,
   Harry J. Lask.